Nov. 15, 1955 H. R. VAN DEVENTER 2,724,016
TELEPHONE ANSWERING AND RECORDING DEVICE
Filed May 27, 1950 2 Sheets-Sheet 1

INVENTOR.
H. R. VAN DEVENTER
BY
Van Deventer & Shively
ATTORNEYS

Nov. 15, 1955 H. R. VAN DEVENTER 2,724,016

TELEPHONE ANSWERING AND RECORDING DEVICE

Filed May 27, 1950 2 Sheets-Sheet 2

INVENTOR.
H. R. VAN DEVENTER

BY
Van Deventer & Shively
ATTORNEYS

United States Patent Office 2,724,016

Patented Nov. 15, 1955

2,724,016

TELEPHONE ANSWERING AND RECORDING DEVICE

Harry R. Van Deventer, New York, N. Y., assignor to Telephone Answering and Recording Corporation, New York, N. Y., a corporation of Delaware Application May 27, 1950, Serial No. 164,735

28 Claims. (Cl. 179—6)

This invention relates to a telephone answering device which can also if desired, be used for recording incoming messages at an unattended telephone.

The instant invention is mainly directed to the control circuits in such a device and has for an object the provision of the necessary controls without the use of the usual starting relay heretofore necessary. The invention, therefore, affords a simple and inexpensive device for the purposes intended, having few parts of simple construction and free from circuit complications commonly met with in such devices.

Other objects and advantages will be apparent from the following specification wherein is disclosed a device suitable for use on a common battery communication circuit hereinafter termed a telephone line or circuit, and such a circuit may terminate in the usual manual or automatic exchange as the device does not change the central office equipment or operation in any way and may be used with existing telephones and equipment without changing them in any way.

While shown as applied to disc phonographs, it is readily apparent that the schematic circuits herein described may be applied to other types of phonographs such as wire and tape recorders by modifications well within the scope of those skilled in the art. The details of the invention are therefore subject to many changes and modifications, the invention being as defined by the appended claims.

In the accompanying drawings:

Figure 2 is a top view of the talk-out record used in the device, Fig. 1;

Figure 3 is an end view of the reproducer arm used in the device, Fig. 1, with a sectional view of the record, Fig. 2;

Figure 4 is a top view of an alternate form of talk-out record lying over the large record blank 24a;

Figure 5 is an end view of the reproducer arm used in the device, Fig. 1, with a sectional view of the record Fig. 4; and Figure 6 is a schematic diagram of an alternate circuit of the timer device, which may be used instead of the arrangement shown in Fig. 1.

*Control method*

Devices used for answering incoming telephone calls and taking messages therefrom have a certain sequence of operations that is common to all and necessary to perform those functions. The sequence must be started by the ringing current which ordinarily operates the telephone ringer and whereby a reproducing phonograph is connected to the telephone line. The phonograph delivers a message, selected by the subscriber, to the calling party and at the end of that message, usually termed the "talk-out" message, the reproducing phonograph is either physically disabled or electrically disconnected and a recording phonograph is connected to the telephone line so that any message the calling party may wish to leave will be recorded, after which the device will automatically stop and re-set itself for the next call.

Heretofore, this sequence has been controlled by various methods, including complicated switching arrangements and expensive timing devices. The present invention, however, novelly provides a simple and economical method of control, showing the same as applied to disc type phonographs where a reproducing arm must traverse a record and be returned to its starting position and a recording element must be raised and lowered to the record.

Figures 2, 3, 4, 5, 6:
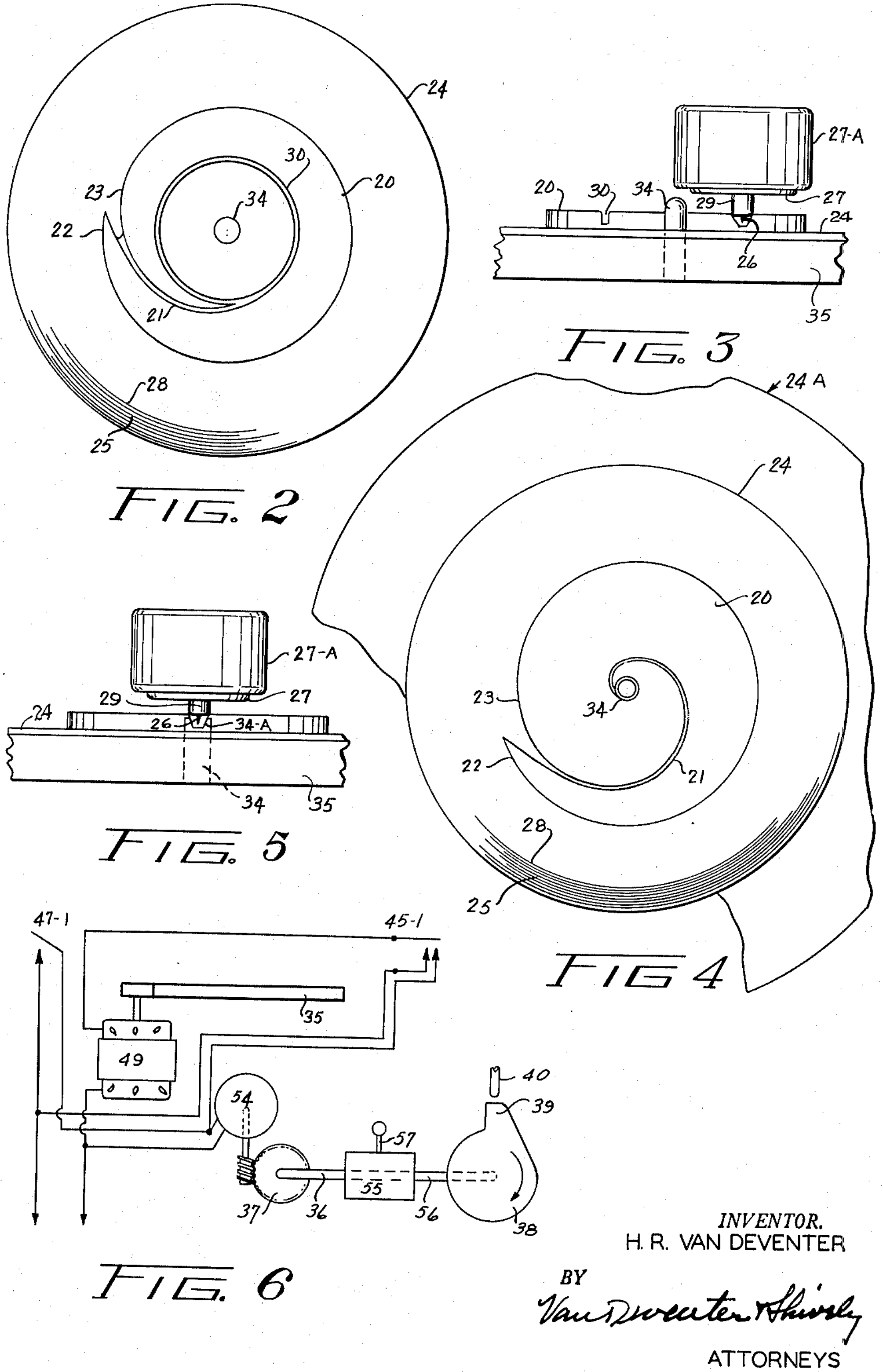

A disc 20 shown in Fig 2 has a groove 21 cut partially through its thickness and extending inwardly from its outer edge 22 in an arc toward the center of the disc. At some distance from the center of said disc, the groove assumes a circular form, coming about to meet itself after describing a complete circle. At the entrance 23 the groove has been cut completely through the thickness of the disc for a short period of its length and the edges of said groove at said entrance are beveled.

The disc 20 is placed concentrically over the record 24 having the talkout message 25 recorded thereon, so that the needle 26 of the playback element 27, after leaving the last groove 28 of the talkout message, will swing toward the edge of the disc 20 and become caught in the entrance 23 of the groove 21. Fig. 3 shows the needle of the playback arm as having a bushing 29 surrounding it for most of its length in such a manner as to allow the point of the needle to rest on the record, but when said needle is carried into the groove 21 the bushing 29, being of greater width than the groove, rides up on the top of the disc, lifting the needle from the record to a point higher than the bottom of the groove, so that the point of the needle never comes in contact with the material of the disc 20. The playback arm is then guided, by reason of the side of the groove bearing against the side of the needle, into the circular portion 30 of the groove where it is held stationary with the disc moving beneath it until the end of the cycle, when the arm is returned to its starting position, which action will be presently described.

In moving into the circular portion 30 of the groove 21, a switch 31 is operated by a finger 32 on the shaft 33 of the playback arm 27–A, said switch controlling the mid-cycle shift of circuits from playout to record-in.

An alternate form of the disc 20 is shown in Figs. 4 and 5 where the groove is made in a similar manner, but, rather than assume a circular form near the center of the disc, takes a long path of travel into the center post 34 of the turntable 35. Said center post is made in such a manner that its height is slightly less than the combined thickness of the record 24 and the disc 20. In the top of the center post 34 is a depression 34–A of depth enough to allow the needle 26 to be held in said depression while the turntable revolves. The point of the needle is held from the bottom of the depression by the bushing 29.

Although, for the sake of simplicity, this method of controlling the mid-cycle shift of circuits is shown as applied to a machine having one turntable for both the talkout and the message taking record, it is obvious that the same can be used in a machine having a separate turntable for the talkout record.

Figure 1:
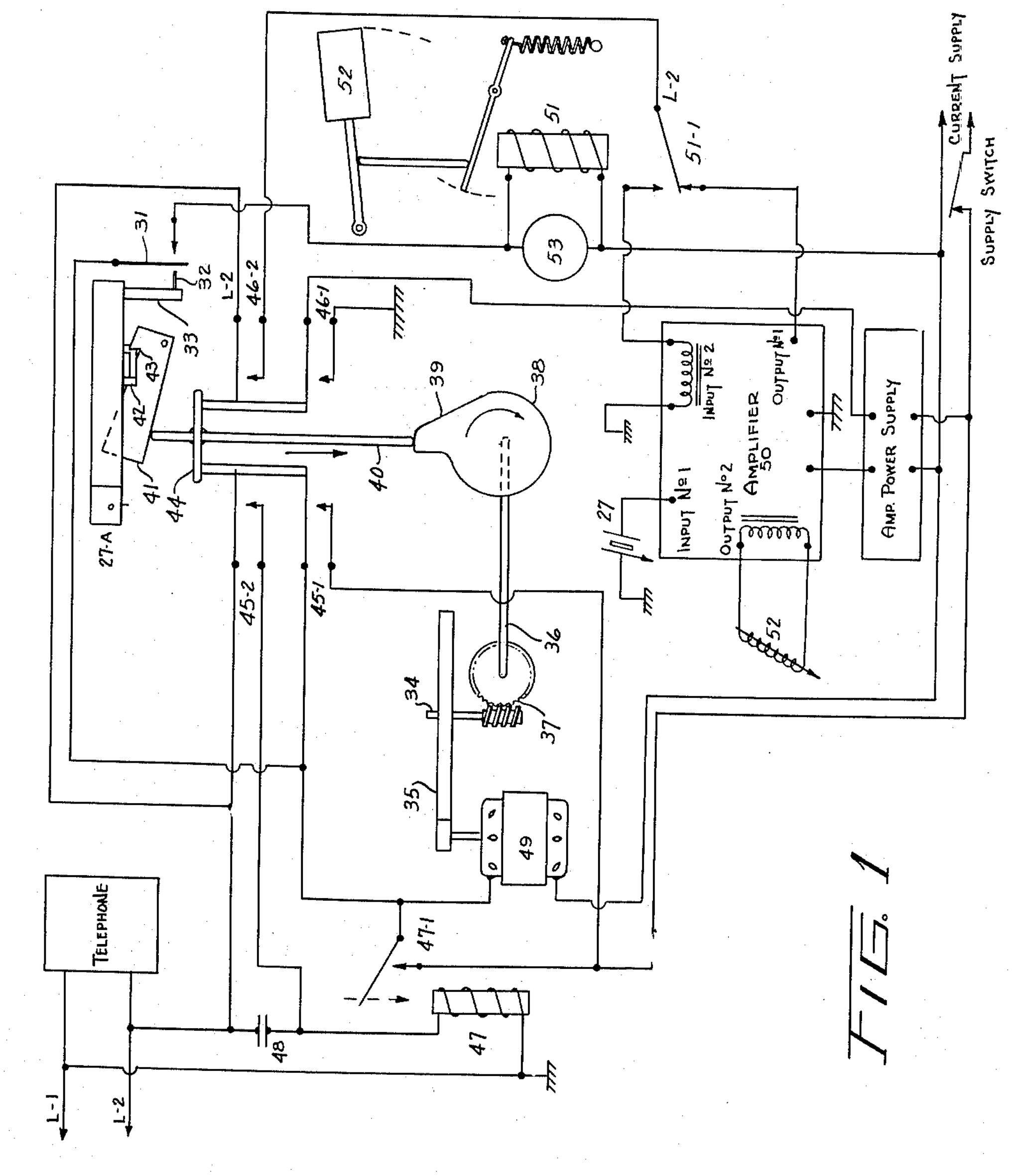
Figure 1 is a schematic diagram of a device embodying the invention and the circuits thereof.

Figure 1 shows a timer mechanism including a shaft 36 driven through a worm gear 37 or other speed reducing means from the center post 34 of the turntable 35 driven by motor 49 at a lower speed than the motor. Said shaft carries on its axis a cam 38, one revolution of which is equal to the maximum time desired for a complete cycle of answering and recording. The cam 38 has at a point on its perimeter a protrusion 39 upon which rests a free moving shaft 40 extending upwardly to a lever 41 which holds the playback arm 27–A out of operative relationship with the record. Lever 41 and its associated roller 42 on the playback arm 27–A have been fully described in previous patents such as No. 2,261,420, dated November 4, 1941, and need not be detailed here except to say that, when the free end of lever 41 is raised, the playback arm 27–A rolls back to its starting position 43.

The shaft 40 has a disc 44 attached at a point along its length for the purpose of operating a pair of switches 45 and 46 by reason of the vertical movement of said shaft.

Fig. 1 shows a ringing relay 47 and its associated condenser 48 connected across the telephone line L–1 and L–2. Said relay, upon being energized, closes its contacts 47–1 to energize a motor 49 which moves the turntable 35. The motor 49, being energized only in surges relative to the pulses of the ringing current, moves the turntable incrementally upon each pulse. Said turntable, in turn, intermittently moves the cam 38 through the worm gear 37 and the shaft 36 and after a number of rings, dependent upon the breadth of the protrusion 39, the cam has moved far enough to remove said protrusion from beneath the shaft 40, allowing said shaft to fall, thus lowering the playback arm 27–A to the record and closing the switches 45 and 46. Switch 45, in closing its contacts 45–1, fully energizes the motor 49 so that the turntable now moves with constant speed and the cam 36 begins a cycle of one complete revolution. Switch 45, in closing its contacts 45–2, short circuits the ringing condenser 48 and places the winding of relay 47 (which may have a high impedance to voice currents) across the telephone line for the purpose of operating the supervisory signal (or switches or relays on dial systems) at the telephone exchange. Switch 46, in closing its contacts 46–1, energizes the amplifier 50.

The playback element 27 is permanently connected into the input No. 1 of said amplifier, the output of which is connected to the L–2 side of the telephone line through the normally closed side of contacts 51–1 on the relay 51, and through contacts 46–2 on switch 46. L–1 of the telephone line is connected to the chassis which is a common return for all voice circuits. Therefore, the talkout message is picked up by the playback element 27 and expressed through the amplifier 50 into the telephone line.

The playback arm 27–A traverses the talkout message in the normal manner and at the end of said talkout message, swings toward the center of the disc 20 as previously described and operates the switch 31, also previously described. Switch 31, in closing, energizes the relay 51 which lowers the recording element 52 to the record in a manner similar to that described in co-pending application Serial Number 164,734 filed May 27, 1950, and, through its contacts 51–1, switches L–2 of the telephone line from the output No. 1 of the amplifier 50 to the input No. 2 of same so that any speech then received on the telephone line will be expressed through the amplifier and via output No. 2 thereof, into the recording element 52 to be recorded on the record 24A. Also, in closing, switch 31 energizes a motor 53 which drives the recording arm across the record in a manner described in said co-pending application.

The cam 38, meanwhile, has continued to revolve until the protrusion 39 raises the shaft 40 which lifts the free end of lever 41 and allows the playback arm 27–A to roll back to its starting position 43. Also, in moving upwards, the shaft 40 opens the contacts of the switches 45 and 46, thus re-setting the device for the next call.

Fig. 6 shows an alternate form of timing device. Here a timer motor 54 is connected to the starting circuit 45–1 as shown and the timer mechanism 36, 38, 40, and the contacts operated by shaft 40 are operated independently of motor 49 which is now controlled by contacts 45–1. This takes the starting load of motor 49 off the contacts 47–1 of relay 47 which now only carry the small current necessary for motor 54. It will be observed that in the case of a common battery telephone line, as soon as timer motor 54 operates to close contacts 45–2, that the condenser 48 is short circuited, thus placing the coil 47 directly across the telephone line. When this occurs, the coil 47, is energized by direct-current from the central office and contacts 47–1 remain closed keeping motor 54 (Fig. 6) in operation until the contacts 45–2 of the timer are operated as herein described.

By interposing any suitable form of manually adjustable speed-changing mechanism 55 between the driving shaft 36 and the driven shaft 56 of the timing device, by setting the control—such as lever 57—the time in which cam 38 will make one revolution can be varied.

Usually a talkout message seldom requires more than 20 seconds and if the lever 57 is set to cause cam 38 to make its revolution in two minutes, then the recorded message could be 100 seconds long; should the talkout consume 40 seconds, then the recording could be 80 seconds, or if the lever was set for 150 seconds, the talkout being 40 seconds, the recording could be 110 seconds. It will be noted that there is a time delay between the time the ringing relay 47 closes its contacts 47–1 and the operation of the switches 45–1, 45–2, 46–1 and 46–2, dependent upon the breadth of the protrusion or operating face 39 on the cam 38 of the timing mechanism moved by motor 49 or 54. This prevents the operation of the device by stray impulses that may come in over the telephone line.

Most telephone central offices have machine ringing, where the ringing current is applied to the line from one second to one and a half second periods, with a silent period in between. By properly proportioning the protrusion 39, the device can be set to respond at one full ring or less, or may be designed to require more than one full ring if desired.

The circuits and switches controlling the cyclic operation of the device may be briefly described as follows, referring to Fig. 1:

The first control circuit includes the relay contacts 47–1, the source of current marked "current supply," lower right of Fig. 1, and the driving motor 49.

The second control circuit includes the switching means 45–2 operated by driving motor 49 to short circuit the contacts 47–1 of relay 47.

The third control circuit includes the switching means 46–1, 46–2 operated by the driving motor 49, the speech circuit of the reproducing phonograph being connected to the telephone line circuit L1, L2 by this switching means. The circuit can be readily traced from the amplifier output No. 1 to the closed contact 51–1 to contact 46–2, to L2 and from L1 (chassis ground) to the chassis ground shown on the amplifier 50.

There is a switch means operated by the conjoint action of the translating means (reproducer 27 mounted on arm **27*a*) and the sound record, said means including normally open contacts 31**.

The fourth control circuit includes the source of current, a recorder motor 53, and means including the contact 31 of the switch means, previously mentioned, whereby the motor 53 will operate upon the closing of said contacts.

Suitable means, such as the relay 51, is provided, controlled by the switching means including the contacts 31, for connecting the input No. 2 of the amplifier 50 (which is the input of the recording phonograph) to the line circuit, and for disconnecting the translating means 27 from said line circuit during the operation of the recording phonograph.

It will be noted that when relay 51 operates, its contacts 51–1 disconnect the No. 1 output of amplifier 50 to which the translating device 27 is connected via the associated input No. 1, and connects the No. 2 input, connected to the recording element via its associated output No. 2.

As relay 51, controlling the contacts 51–1, is bridged across motor 53, when the device is switched from talk-out to talk-in, the relay remains operated as long as the motor 53 is in operation.

It will be evident from the foregoing that the herein described telephone answering and recording device has a fixed cycle time, during which, regardless of the length of the talk-out and recorded messages, the telephone line is closed or "busy" until the timing device opens its contacts 45–2 to open the D. C. circuit through the coil of relay 47 or any equivalent impedance placed across the line by the operation of said contacts. Such a fixed cycle eliminates the use of voice relays and other complicated and expensive control devices otherwise necessary to release the line circuit when the recording period is ended.

It will also be noted that, by setting the timer so that the cam 38 completes its revolution as soon as the talkout message is completed, that the device can be used as a telephone answering device only and the recording feature omitted. In this case, the recording parts, motor 53, relay 51, recording element 52 can be omitted if desired, together with the input and output circuits No. 2 of amplifier 50.

By providing the device with appropriate switching relays, the device can be used to—

(a) Record the talkout message, using the transmitter of the telephone as a mircophone;

(b) Play back the talkout message and any incoming messages recorded;

(c) Record 2-way conversations.

Reference is made to the co-pending application Serial Number 133,506 filed December 17, 1949, Patent No. 2,713,088, for a detailed description of such switching keys and the circuits used therewith and their adaption to the control circuits herein disclosed will be readily understood. As these form no part of the instant invention, they are not described in detail.

It will be apparent from the foregoing description that the device has a total cycle time determined by the operation of the timer and that a means is provided for varying the duration of the talkout period by merely varying the length of the talkout message 25. The recording period is also variable by means of the adjustable mechanism 55. In any event, the talkout and recording periods which follow each other during each cycle of operation, total a lesser time than the time set by the operation of cam 38.

For example, if the cam 38 makes a complete revolution in two minutes, and the talkout time is twenty seconds, and the recording message only requires forty seconds while the device therein stops recording, sixty seconds remain during which the winding 47 remains across the telephone line, which therefore will test "busy" until the cam 38 operates to open contacts 45–2 and release the line.

What is claimed is:

1. In combination with a telephone line circuit, a device including a relay connected to said circuit and responsive to ringing current flowing therein; a circuit including normally open contacts on said relay, a source of current and a motor whereby said motor may be energized upon closing of said contacts; a timing device and means for operating same upon energization of said relay, said timer including normally open timer contacts connected in parallel with said relay contacts and to said source of current and said motor whereby said motor will continue to operate upon the closing of said timer contacts; a record moved by said motor, said record having a recording of speech thereon; a reproducer means operated by said timing device for causing said reproducer to engage said record; an amplifier connected to said reproducer; and means including contacts in circuit with said amplifier controlled by said timer for connecting the output circuit of said amplifier to said telephone line circuit during the period said reproducer is in engagement with said record to deliver said recording of speech to said line circuit.

2. The combination as claimed in claim 1 including means including contacts controlled by said timer for connecting an impedance across said line circuit during the period said reproducer is in engagement with said record to deliver said recording of speech to said line circuit.

3. The combination as claimed in claim 1 wherein said timer device includes a cam adapted when at rest to position said reproducer in a non-operating position in respect to said record.

4. The combination as claimed in claim 1 wherein said motor drives a record turntable at reduced speed including gearing between said turntable and timer whereby the timer is driven at a lesser speed than the table.

5. The combination as claimed in claim 1 including speed changing means to vary the duration of the operation of said timer to thereby vary the total cycle time of the device.

6. The combination as claimed in claim 1 wherein said timing device includes contacts controlling the current supply to said amplifier.

7. In combination with a telephone line circuit, a device including a relay connected to said circuit and responsive to ringing current flowing therein; a circuit including normally open contacts on said relay, a source of current and a motor whereby said motor may be energized upon closing of said contacts; a timing device and means for operating same upon energization of said relay including normally open timer contacts connected in parallel with said relay contacts whereby said motor will continue to operate upon the closing of said timer contacts; a record moved by said motor, said record having a recording of speech thereon; a reproducer; means operated by said timing device for causing said reproducer to engage said record; an amplifier connected to said reproducer; means controlled by said timer including contacts for connecting the output circuit of said amplifier to said telephone line circuit during the period said reproducer is in engagement with said record to deliver said recording of speech to said line circuit; switch means controlled by the movement of said reproducer at the end of its engagement with said record, a recording element; electrically operated means controlled by said last switch means for moving said recording element to engage a record; means for disconnecting said output circuit of said amplifier from said line circuit and connecting the input circuit thereof to said line circuit during a recording period.

8. The combination as claimed in claim 7 wherein said operating means includes an electromagnet.

9. The combination as claimed in claim 7 wherein said switch means includes normally open contacts which, when closed, extend said telephone line circuit to serially include open contacts on said operating means and the input circuit of said amplifier.

10. The combination as claimed in claim 7 including a motor means, controlled by said switch for moving said recorder across a record.

11. In combination, a telephone line circuit; a revolvable record having a recording of sound thereon; a reproducer having a needle engaging said record and having a fixed starting position relative thereto; means for connecting said reproducer to said telephone line circuit to transmit said sound recording thereover; means on said record following said recording for moving said reproducer to a predetermined position, a switch operated by the movement of said reproducer and having contacts operated when said reproducer reaches said predetermined position; said switch contacts being held operated while said record continues to revolve; means for releasing said reproducer from said first recording and restoring same to said starting position; a recording phonograph, and means controlled by said switch for connecting said last phonograph to said line circuit.

12. The combination as claimed in claim 11 wherein said reproducer is mounted on a pivoted arm having a shaft and said switch is operated by the movement of said shaft.

13. The combination as claimed in claim 11 wherein said first means includes a groove adapted to receive the needle of said reproducer, said groove terminating in a circular track concentric with the center of revolution of said record and determining the predetermined position at which said switch contacts are held operated while said record continues to revolve during recording.

14. The combination as claimed in claim 11 wherein said first means includes a groove terminating in a depression at the center of the record whereby said reproducer is held at said predetermined position and said switch contacts are held operated while said record continues to revolve.

15. In combination, a reproducing phonograph including a movable reproducer adapted to traverse a record, a switch controlled by the movement of said reproducer, said switch having normally open contacts serially included in a circuit including a source of current; a drive motor serially included in said last circuit; a recording phonograph driven by said motor; a relay connected in parallel with said motor, a communication circuit, switch means for connecting said last circuit to said reproducing phonograph, and means operated by said relay for disconnecting said reproducing phonograph from said communication circuit and connecting said recording phonograph thereto while said first switch is held in operative position by said reproducer.

16. In combination, a communication circuit, a relay connected thereto having normally open contacts, a circuit including said contacts, a source of current and a phonograph motor whereby said motor will operate upon the energization of said relay and the consequent closing of said contacts, a phonograph including a record driven by said motor; means connected to said circuit for continuing the operation of said motor after an intermittent closing of said first contacts and for continuing said operation for a predetermined period including an arm lift, a reproducing arm adapted to be engaged and moved by said lift; a reproducer carried by said arm and adapted to engage the phonograph record moved by said motor, a switch including means controlled by said arm, a circuit including said source of current and contacts on said switch; a second motor of a recording phonograph, a relay connected to said last circuit having a winding and contacts, and an amplifier connected to said source of current and to said phonographs, said amplifier having output and input circuits controlled by said contacts on said last relay for disconnecting said output circuit from said communication circuit and connecting said input thereto.

17. In an electrically operated telephone answering device, in combination, means to perform a plurality of related functions including automatic answering and incoming message recording over a connected telephone line, said means including a ringing relay adapted to respond to pulses of telephone ringing current and having contacts adapted to close at each pulse, a circuit including a source of current, said contacts and a phonograph motor, a cam driven by said motor, a switch operated by said cam, said cam having a portion shaped to hold said switch in non-operating position during a predetermined number of said pulses, a reproducer connected for operation upon the energization of said motor and having a member adapted to move while said reproducer is operating, a second switch operated by the movement of said member, a relay controlled by said second switch, and a recorder controlled by said relay, said relay having contacts adapted upon energization of said relay to switch said reproducer out of its operating circuit and connect said recorder thereto.

18. In an electrically operated telephone answering device, in combination, means to perform a plurality of related functions including automatic answering and incoming message recording over a connected telephone line, said means including a ringing relay adapted to respond to pulses of telephone ringing current and having contacts adapted to close at each pulse, a circuit including a source of current, said contacts and a phonograph device, a cam driven by said device, a switch operated by said cam, said cam having a portion shaped to hold said switch in non-operating position during a predetermined number of said pulses, a phonograph controlled by said switch, a reproducer connected for operation upon the operation of said switch having a member adapted to move while said reproducer is operating a second switch operated by the movement of said member, a relay controlled by said second switch, and a recorder controlled by said relay, said relay having contacts adapted upon energization of said relay to switch said reproducer out of its operating circuit and connect said recorder thereto.

19. In an electrically operated telephone answering device, in combination, means to perform a plurality of related functions including automatic answering and incoming message recording over a connected telephone line, said means including a talk-out record containing a sound recording and a record blank adapted to receive a sound recording; means including a motor for simultaneously moving said records; means whereby the total time interval during which said records move is predetermined; means including said sound recording and a translating device cooperating therewith whereby the duration of the talkout message may be determined; and means including a translator operable during said predetermined time interval and while both said records are in motion, for recording sound on said blank via a telephone line operatively connected to said device.

20. In an electrically operated telephone answering device, in combination, means to perform a plurality of related functions including automatic answering and incoming message recording over a connected telephone line, said means including a talk-out record containing a sound recording and a medium adapted to receive a sound recording thereon; means including a motor for simultaneously moving said record and said medium; means whereby the total time interval during which said record and said medium are moved is predetermined; a telephone line circuit operatively connected to said device; translating means operable during said time interval and while said record and medium are in motion whereby said talk-out message is delivered to said telephone line; and means operable while said record and said medium are both in motion for recording speech incoming over said telephone line on said medium.

21. In an electrically operated telephone answering device, in combination, means to perform a plurality of related functions including automatic answering and incoming message recording over a connected telephone line, said means including a motor; a shaft driven thereby; a talk-out record containing a sound recording adapted to be rotated by said shaft; a medium adapted to receive a sound recording positioned below said record and surrounding said shaft and adapted to be moved by said motor; a communication circuit operatively connected to said device; means connected to said circuit and responsive to current flowing therein for connecting said motor to a current supply for operation thereby; a translating device connected to said communication circuit and operatively associated with said record to deliver sound recorded thereon to said communication circuit while said record is in motion; a second translating device; and means for operatively connecting said second translating device to said recording medium while same and said record are in motion to record sound received over said communication line on said medium.

22. In an electrically operated telephone answering device, in combination, means to perform a plurality of related functions including automatic answering and incoming message recording over a connected telephone line, said means including a power circuit; a timer connected thereto; normally open contacts in said circuit adapted when closed to complete said circuit and initiate the operation of said timer; means including a device responsive to alternating current for closing said contacts; a motor controlled for operation by said timer during a predetermined period; a reproducing phonograph having a talk-out record moved by said motor; a rotatable cam driven by said timer; a communication circuit; and means controlled by said cam for placing a direct current shunt across said circuit for a time period determined by the movement of said cam.

23. The combination as claimed in claim 22 wherein means for relatively varying the speed of said cam is interposed between said timer and said cam driven thereby.

24. In an electrically operated telephone answering device, in combination, means to perform a plurality of related functions including automatic answering and incoming message recording over a connected telephone line, said means including a power circuit; a timer connected thereto; normally open contacts in said circuit adapted when closed to complete said circuit and initiate the operation of said timer; a communication circuit; means including a device responsive to alternating current flowing in said communication circuit for closing said contacts; a motor controlled for operation by said timer during a predetermined period; a reproducing phonograph having a talk-out record moved by said motor; means for connecting said phonograph to said communication circuit to deliver a message thereto; a rotatable cam driven by said timer; a record blank adapted to receive a recording driven by said motor; means for recording on said blank; means for switching said communication circuit from said reproducing phonograph to said means for recording amplifying means for said phonographs; and a power supply common to said amplifying means.

25. In an electrically operated telephone answering device, in combination, means to perform a plurality of related functions including automatic answering and incoming message recording over a connected telephone line, said means including a horizontal record support adapted to support a talk-out record blank and a second record blank subjacent said first-mentioned record blank; a motor for moving said support; a reproducer positioned to overlie said first-mentioned blank; a recorder positioned in cooperative relationship with said second record blank; amplifying means for said reproducer and recorder; means operable by current flowing in said telephone line for coupling said reproducer thereto and means operable by said reproducer for connecting said recorder to said telephone line to record speech thereover for a predetermined period.

26. In a telephone answering and recording device, a relay having normally open relay contacts and a winding, the latter adapted to be connected to a telephone line circuit for operation thereover by incoming current; a first control circuit including said relay contacts, a source of current, and a driving motor; a reproducing phonograph having a record moved by said driving motor; a second control circuit including switching means therein operated by said driving motor and adapted to short circuit said relay contacts whereby said driving motor is continued in operation independently of said relay contacts; translating means adapted to contact said record; a third control circuit including switching means therein operated by said driving motor; a speech circuit operatively connected to said translating means and said line circuit by said switching means in said third control circuit; switch means operated by the conjoint action of said translating means and said record, said means including normally open contacts; a recording phonograph having a motor; a fourth control circuit serially including said source of current, said last motor and means, including said last normally open contacts, whereby upon the closing of said contacts said last motor will operate; and means controlled by said last switch means for connecting the input of said recording phonograph to said line circuit and for disconnecting said speech circuit therefrom during the operation of the said recording phonograph.

27. The combination, as claimed in claim 26, including means interposed between said driving motor and said switching means in said second and third control circuits for introducing a time delay between the time said relay contacts close and said driving motor begins operation via the switch means in said second control circuit.

28. In a telephone answering and recording device a relay having normally open contacts and a winding, the latter adapted to be connected to a telephone line circuit for operation thereover by incoming current; a phonograph having a record; a motor for moving said record; a first control circuit including said relay contacts, a source of current and a timer motor; a second control circuit, including switching means therein operated by said timer motor and adapted to short circuit said relay contacts and to connect both said motors to said source of current whereby said motors are continued in operation independently of said relay contacts; translating means adapted to contact said record; a third control circuit including switching means therein operated by said timer motor; a speech circuit operatively connected to said translating means and said line circuit by said switching means in said third control circuit, switch means operated by the conjoint action of said translating means and said record, said means including normally open contacts; a recording phonograph having a motor; a fourth control circuit serially including said source of current, said last motor and means including said last normally open contacts whereby upon the closing of said contacts said last motor will operate; and means controlled by said last switch means for connecting the input of said recording phonograph to said line circuit and for disconnecting said speech circuit from said line circuit during the operation of said recording phonograph.

References Cited in the file of this patent

UNITED STATES PATENTS

| | | |
|---|---|---|
| 1,560,226 | Fisher | Nov. 3, 1925 |
| 2,080,812 | Fairbanks | May 18, 1937 |
| 2,093,675 | Henderson | Sept. 21, 1937 |
| 2,171,366 | Hipple | Aug. 29, 1939 |
| 2,261,420 | Shively | Nov. 4, 1941 |
| 2,284,173 | Soukup et al. | May 26, 1942 |
| 2,300,239 | Thiede | Oct. 27, 1942 |
| 2,366,956 | Clausen | Jan. 9, 1945 |
| 2,519,568 | Handschin | Aug. 22, 1950 |
| 2,549,548 | Von Zimmermann | Apr. 17, 1951 |